United States Patent
Tanaka et al.

(10) Patent No.: US 12,116,260 B2
(45) Date of Patent: Oct. 15, 2024

(54) ATTACHMENT AND HOT-WATER SUPPLY DEVICE PROVIDED WITH THE SAME

(71) Applicant: Kura Sushi, Inc., Sakai (JP)

(72) Inventors: Kunihiko Tanaka, Sakai (JP); Hidetoshi Nakamura, Sakai (JP)

(73) Assignee: KURA SUSHI, INC., Sakai (JP)

( * ) Notice: Subject to any disclaimer, the term of this patent is extended or adjusted under 35 U.S.C. 154(b) by 14 days.

(21) Appl. No.: 18/038,320

(22) PCT Filed: Nov. 12, 2021

(86) PCT No.: PCT/JP2021/041806
§ 371 (c)(1),
(2) Date: May 23, 2023

(87) PCT Pub. No.: WO2022/113789
PCT Pub. Date: Jun. 2, 2022

(65) Prior Publication Data
US 2024/0002210 A1    Jan. 4, 2024

(30) Foreign Application Priority Data

Nov. 24, 2020 (JP) .................................. 2020-194592
Mar. 19, 2021 (JP) .................................. 2021-046688

(51) Int. Cl.
*B67D 1/12* (2006.01)
*B67D 1/00* (2006.01)
(Continued)

(52) U.S. Cl.
CPC ............. *B67D 1/12* (2013.01); *B67D 1/0014* (2013.01); *E03C 1/0404* (2013.01); *F16K 31/56* (2013.01)

(58) Field of Classification Search
CPC ......... F16K 31/56; E03C 1/0404; B67C 1/12; B67C 1/0014
(Continued)

(56) References Cited

U.S. PATENT DOCUMENTS

| 4,974,643 A | * | 12/1990 | Bennett | ................... B67D 1/124 |
| | | | | 141/86 |
| 6,058,986 A | * | 5/2000 | Bethuy | ................ B67D 1/1238 |
| | | | | 137/392 |
| 2008/0066826 A1 | * | 3/2008 | Moldthan | ............ B67D 1/1405 |
| | | | | 141/360 |

FOREIGN PATENT DOCUMENTS

| JP | 2942715 B2 | 8/1999 |
| JP | 2005-163458 A | 6/2005 |
| JP | 2014-229595 A | 12/2014 |

OTHER PUBLICATIONS

International Search Report, issued in PCT/JP2021/041806, PCT/ISA/210, dated Dec. 21, 2021.
(Continued)

*Primary Examiner* — Jason K Niesz
(74) *Attorney, Agent, or Firm* — Birch, Stewart, Kolasch & Birch, LLP

(57) ABSTRACT

The present invention is an attachment configured to be attached to a hot-water supply faucet including a nozzle portion that has a discharge outlet that is open downward, and a press button that is disposed below the discharge outlet and horizontally rearward of the discharge outlet, with hot water being discharged from the discharge outlet when the press button is pressed rearward, the attachment including: an attachment body; and a fixing means for fixing the attachment body to the hot-water supply faucet, wherein the attachment body includes: a fulcrum portion that is attachable to the nozzle portion; a body portion extending downward from the fulcrum portion; and a support portion that is
(Continued)

attached to a lower end portion of the body portion, wherein the body portion is formed so as to extend downward past a front surface of the press button, and when the support portion is pressed by a vessel into which hot water is to be poured, the attachment body is configured to pivot and press the press button with the fulcrum portion serving as a fulcrum.

10 Claims, 18 Drawing Sheets

(51) Int. Cl.
*E03C 1/04* (2006.01)
*F16K 31/56* (2006.01)
(58) Field of Classification Search
USPC .......................................................... 141/360
See application file for complete search history.

(56) References Cited

OTHER PUBLICATIONS

Written Opinion of the International Searching Authority, issued in PCT/JP2021/041806, PCT/ISA/237, dated Dec. 21, 2021.

\* cited by examiner

[FIG. 1]
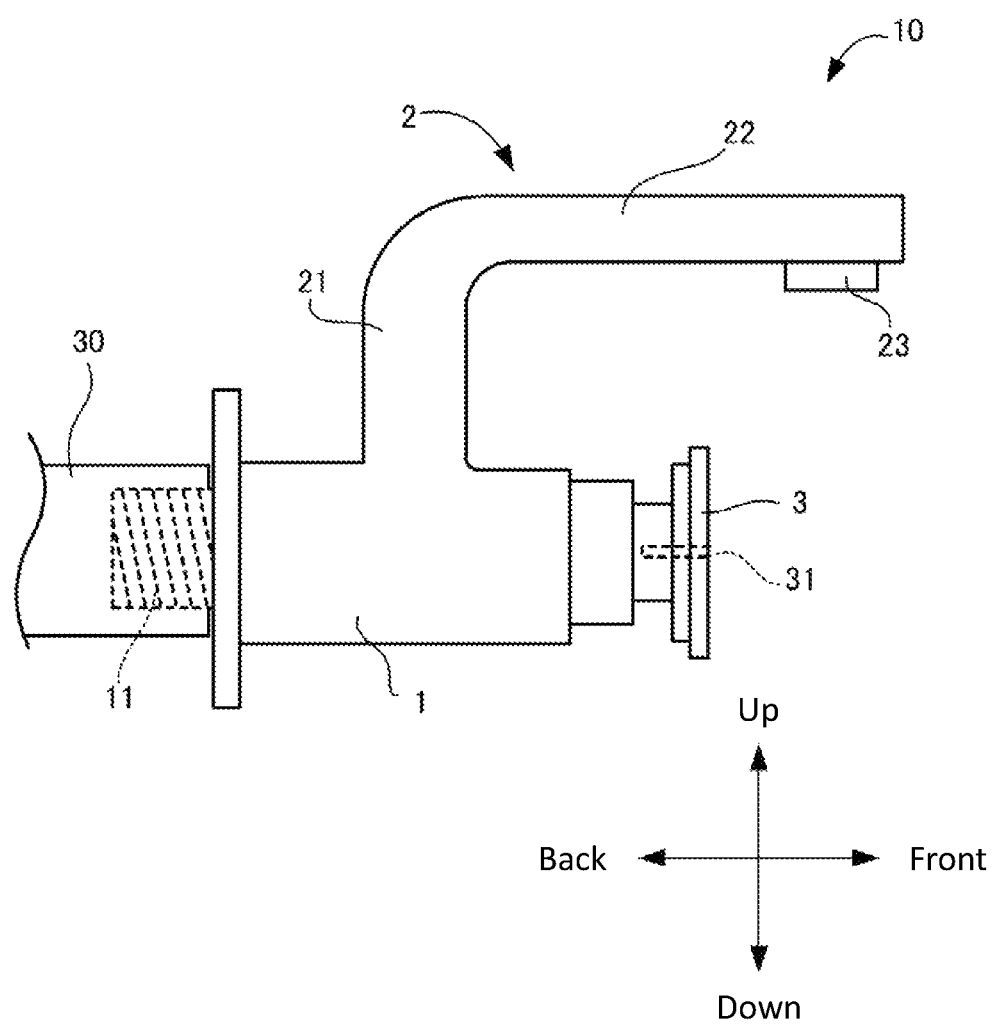

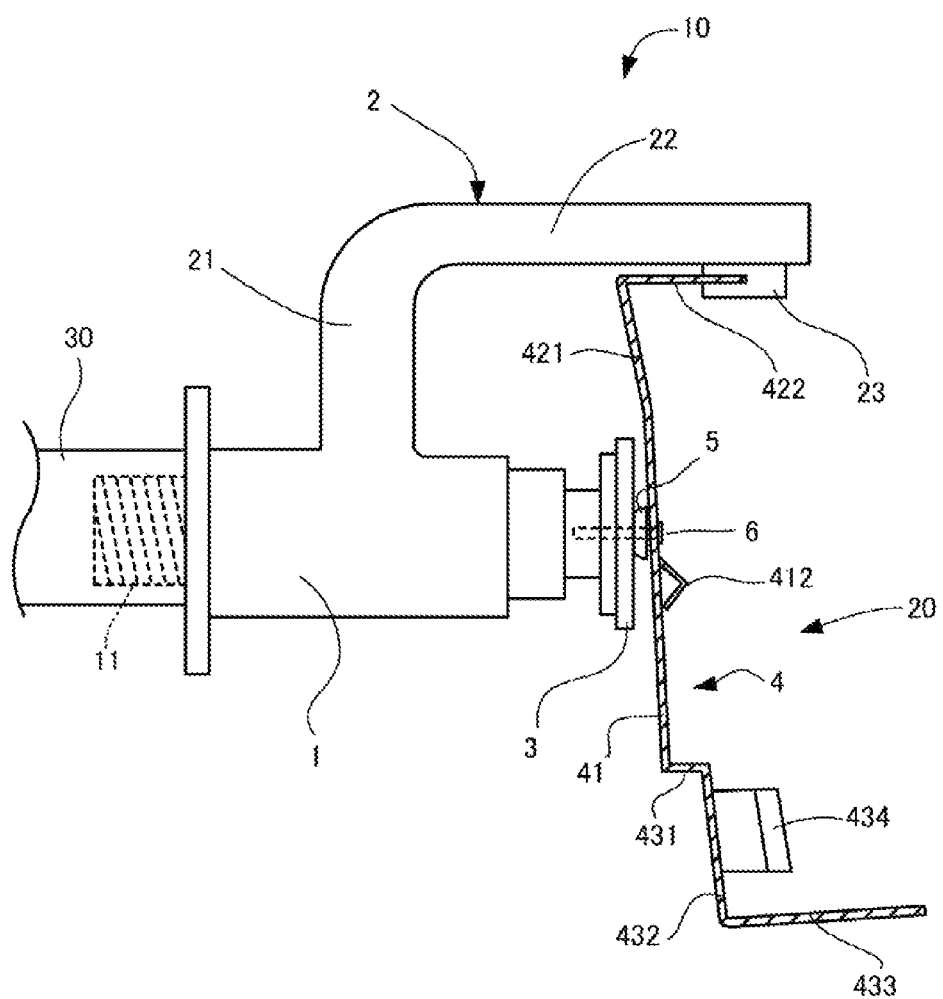
[FIG. 2]

【FIG. 3】
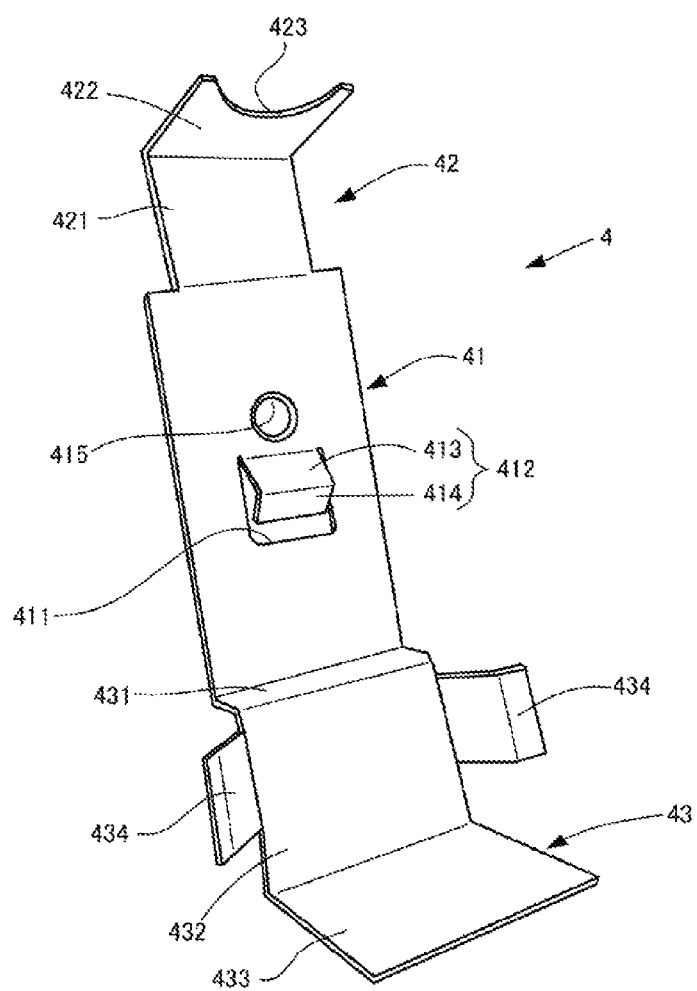

【FIG. 4】
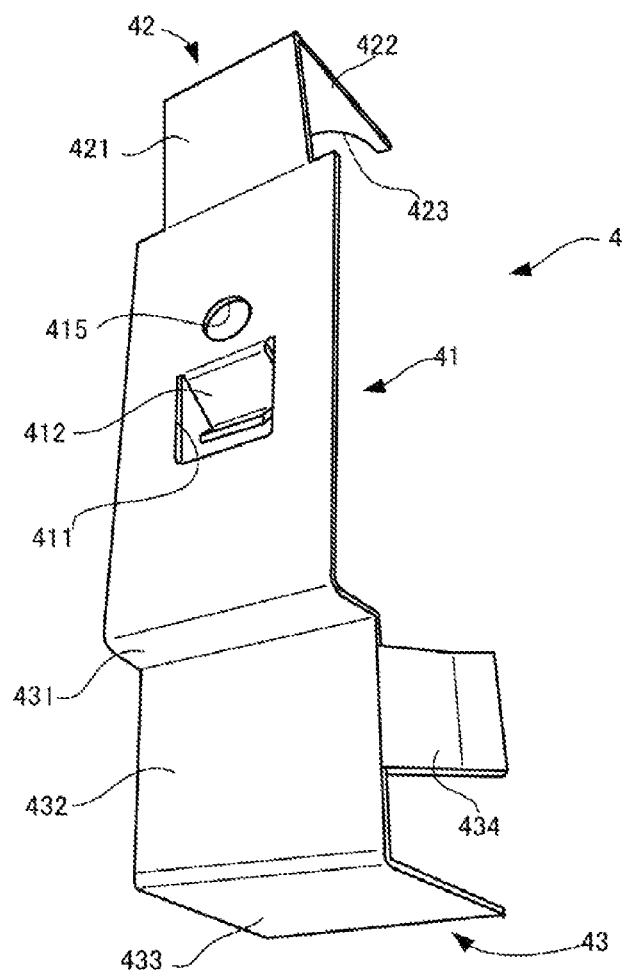

[FIG. 5A]
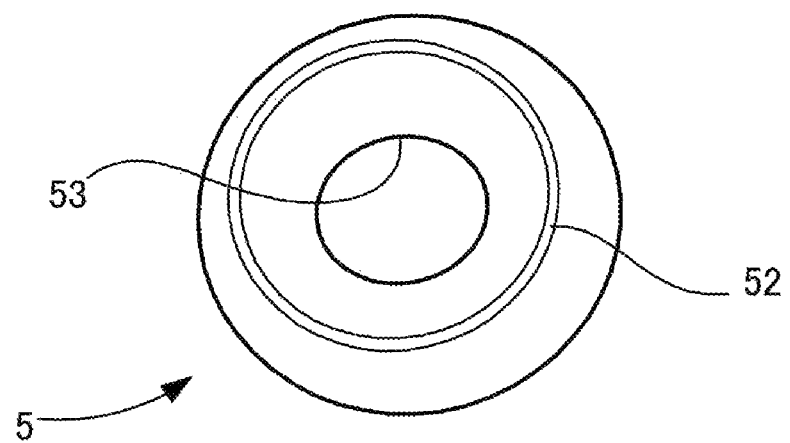

[FIG. 5B]
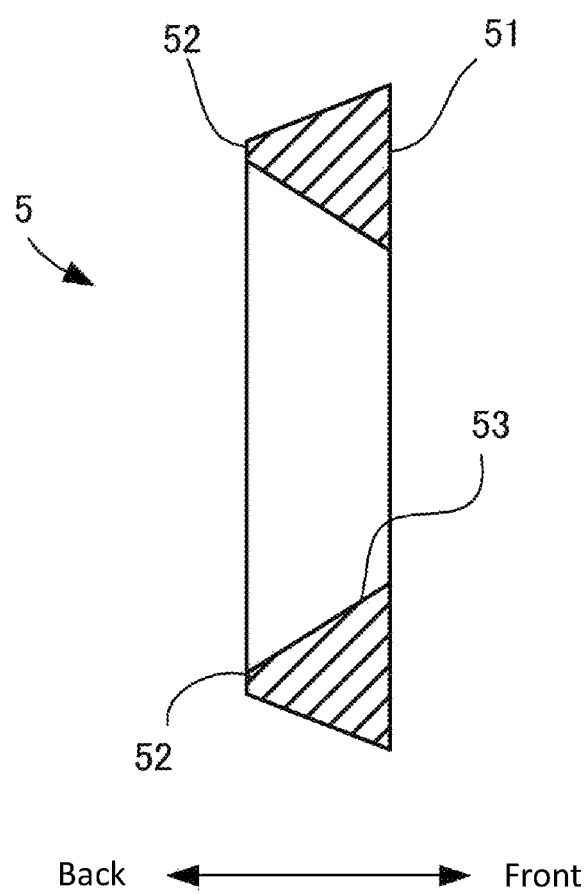

[FIG. 6]
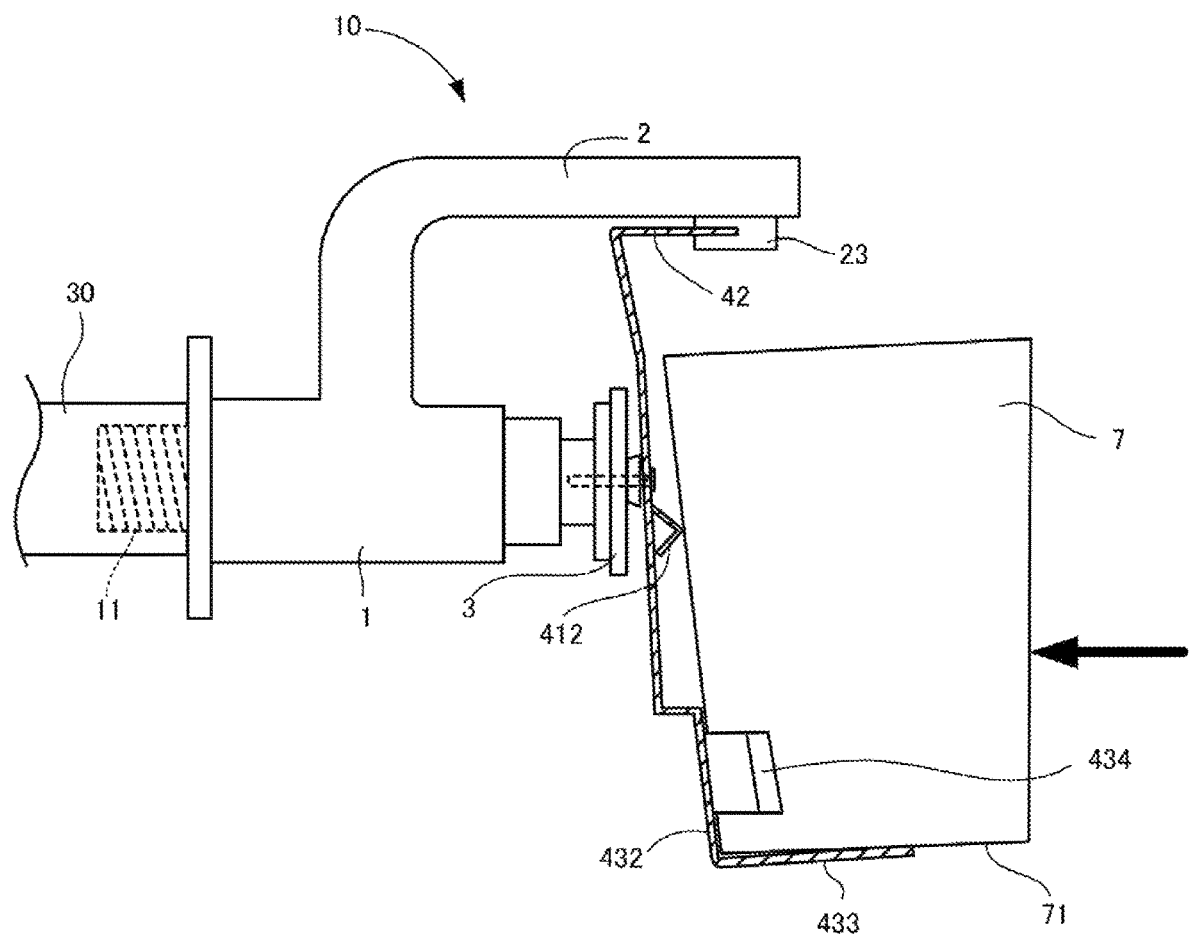

[FIG. 7]
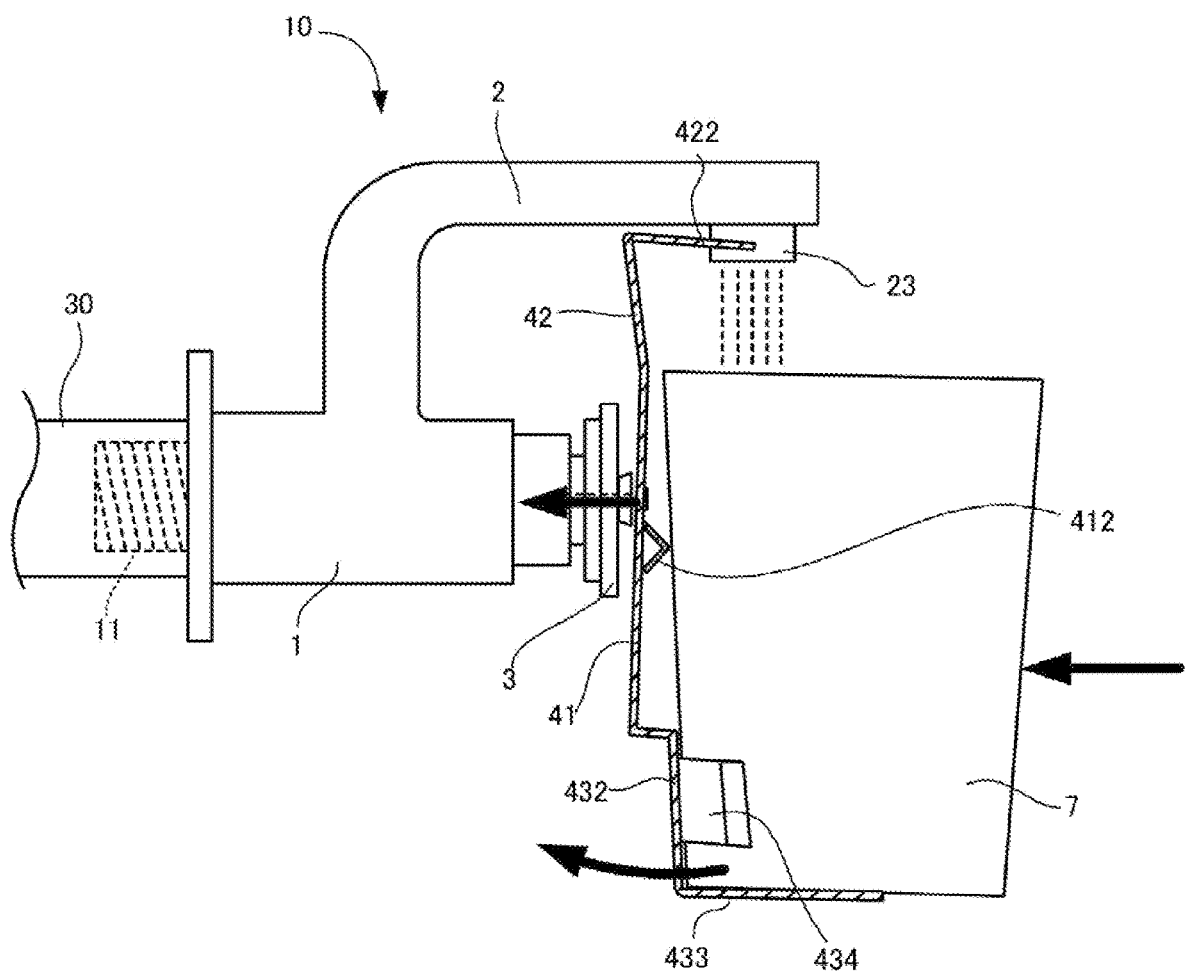

[FIG. 8A]
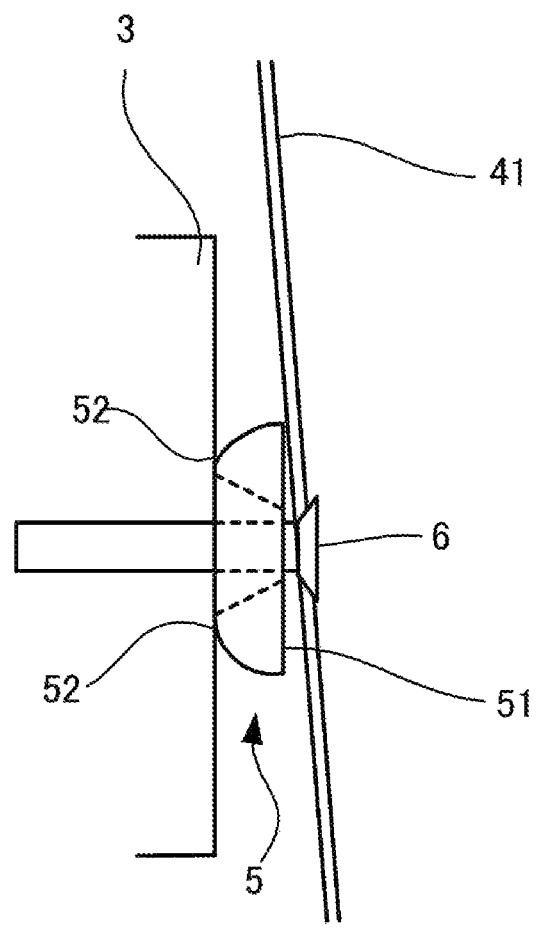

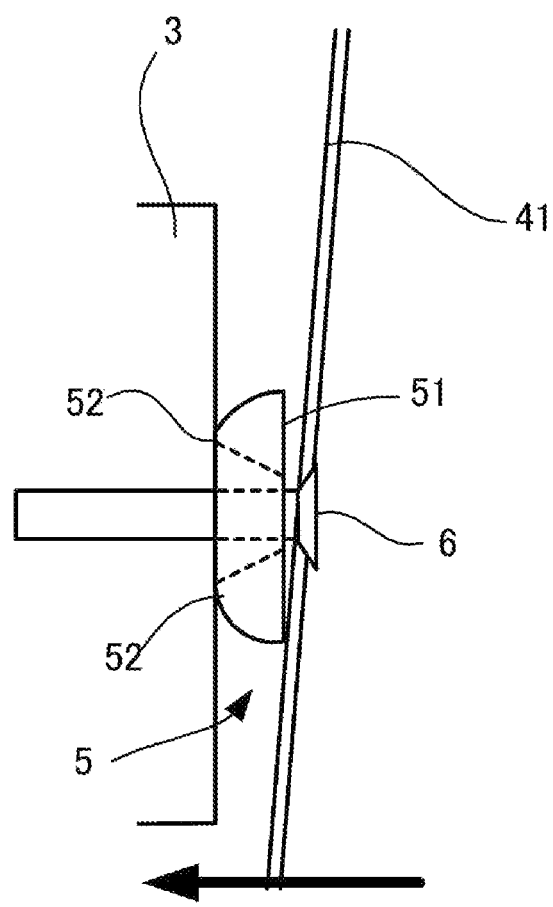
[FIG. 8B]

[FIG. 9]
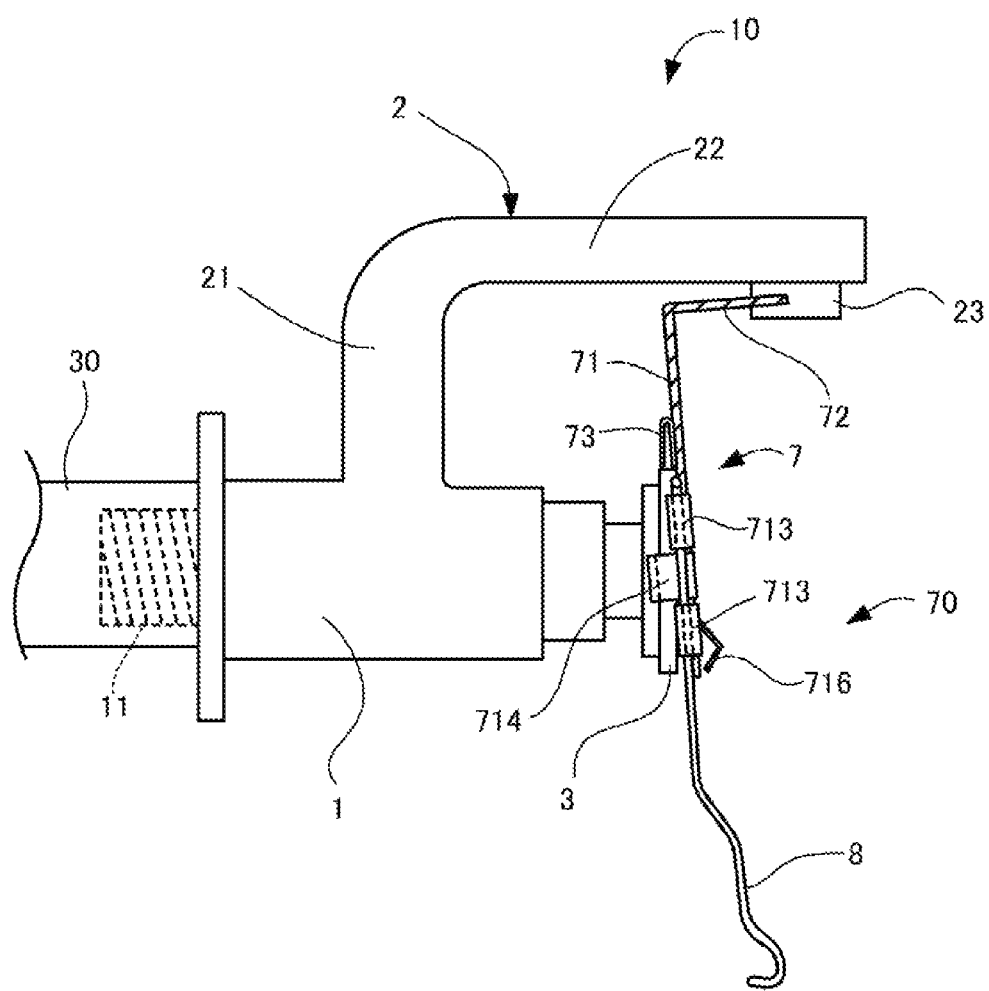

【FIG. 10】
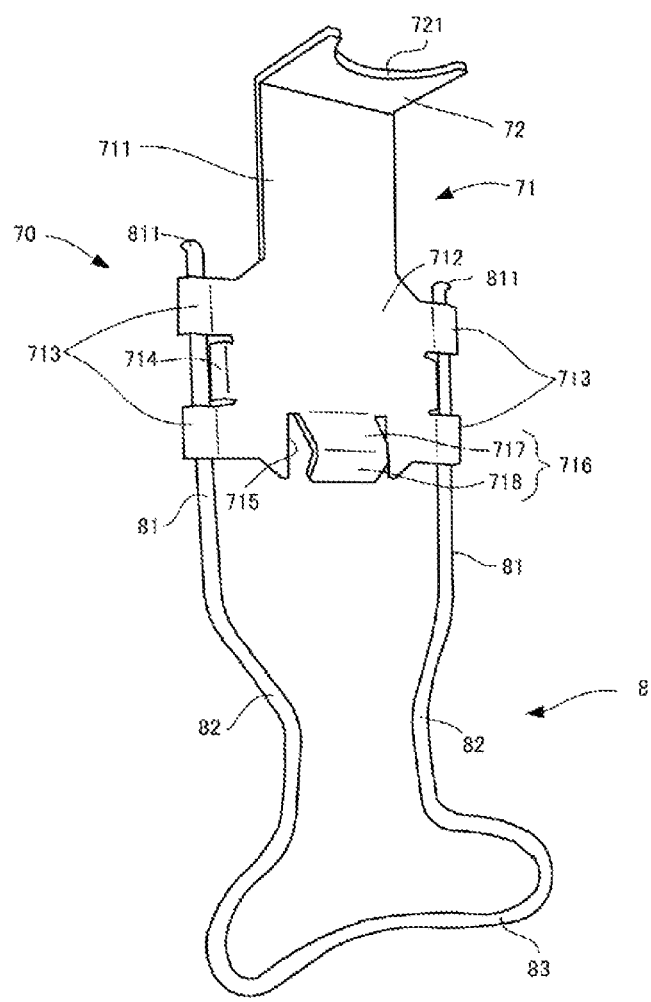

【FIG. 11】
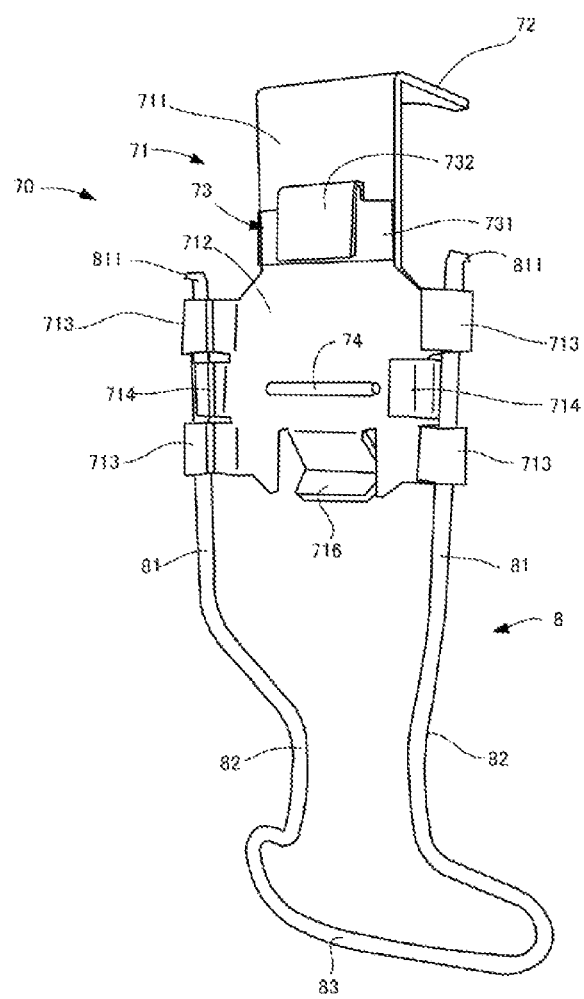

[FIG. 12]
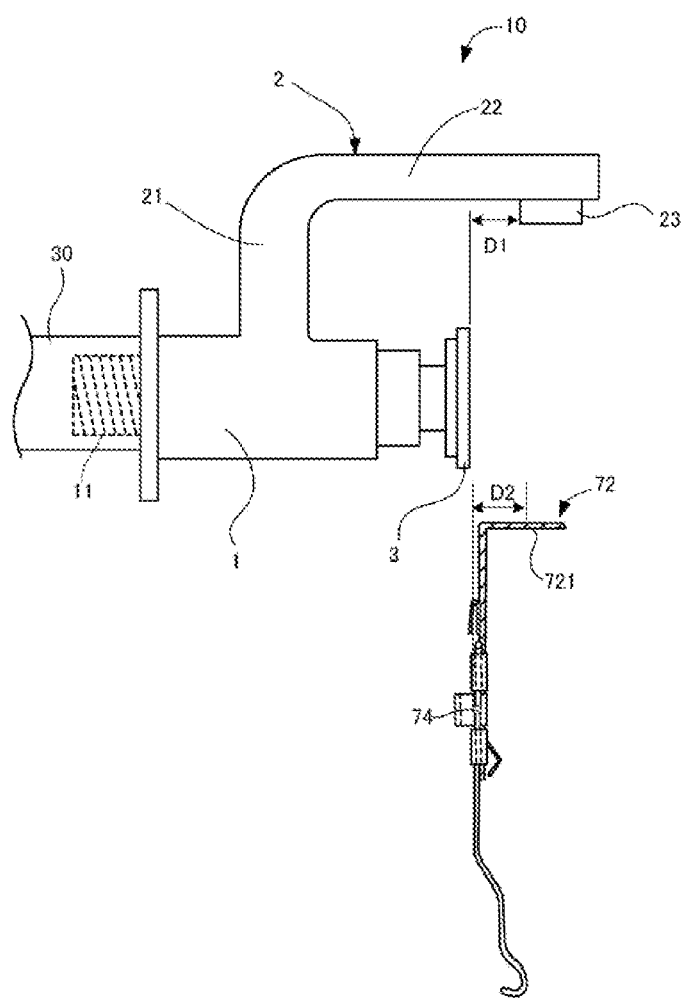

[FIG. 13]
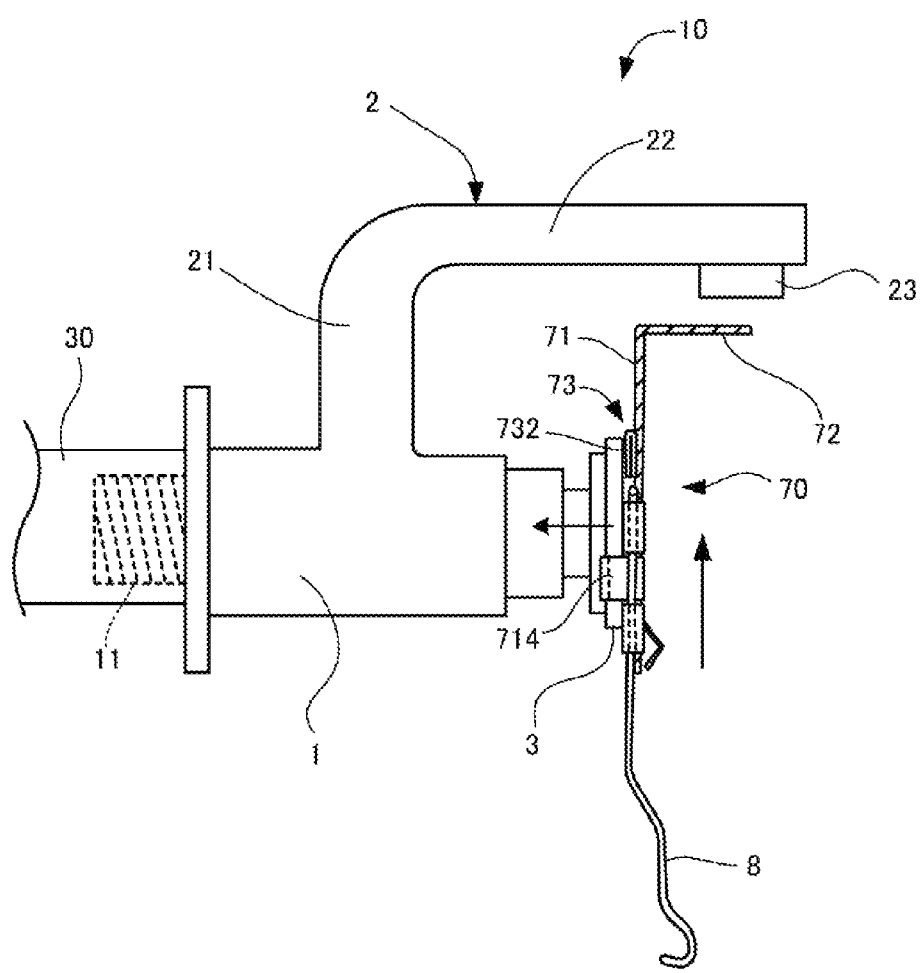

[FIG. 14]
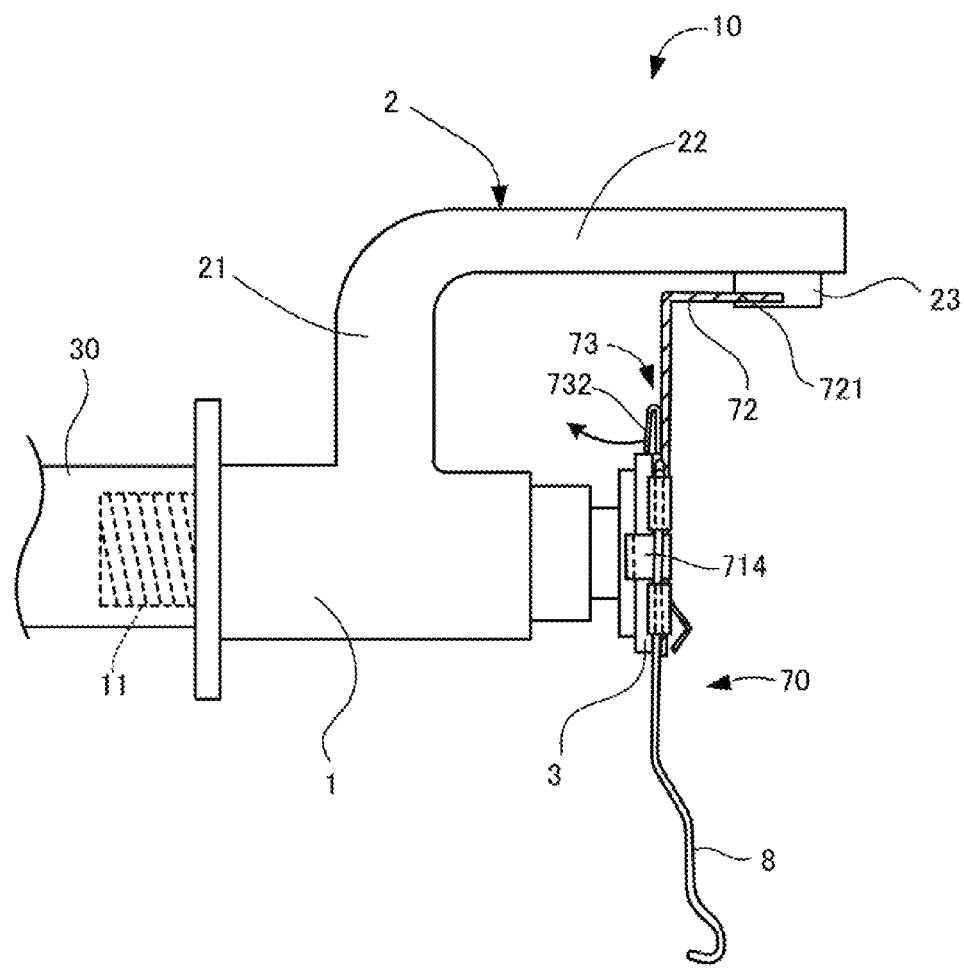

[FIG. 15]
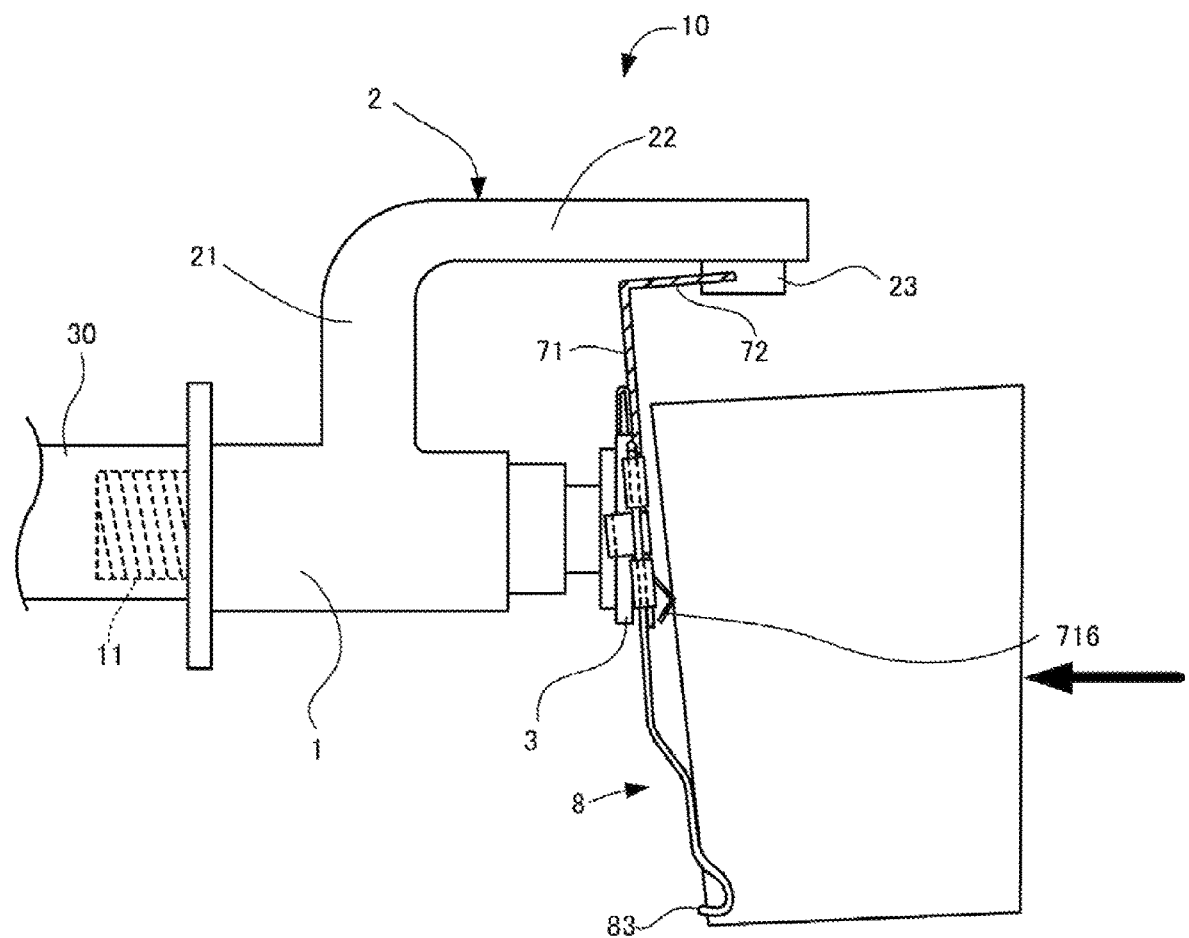

[FIG. 16]
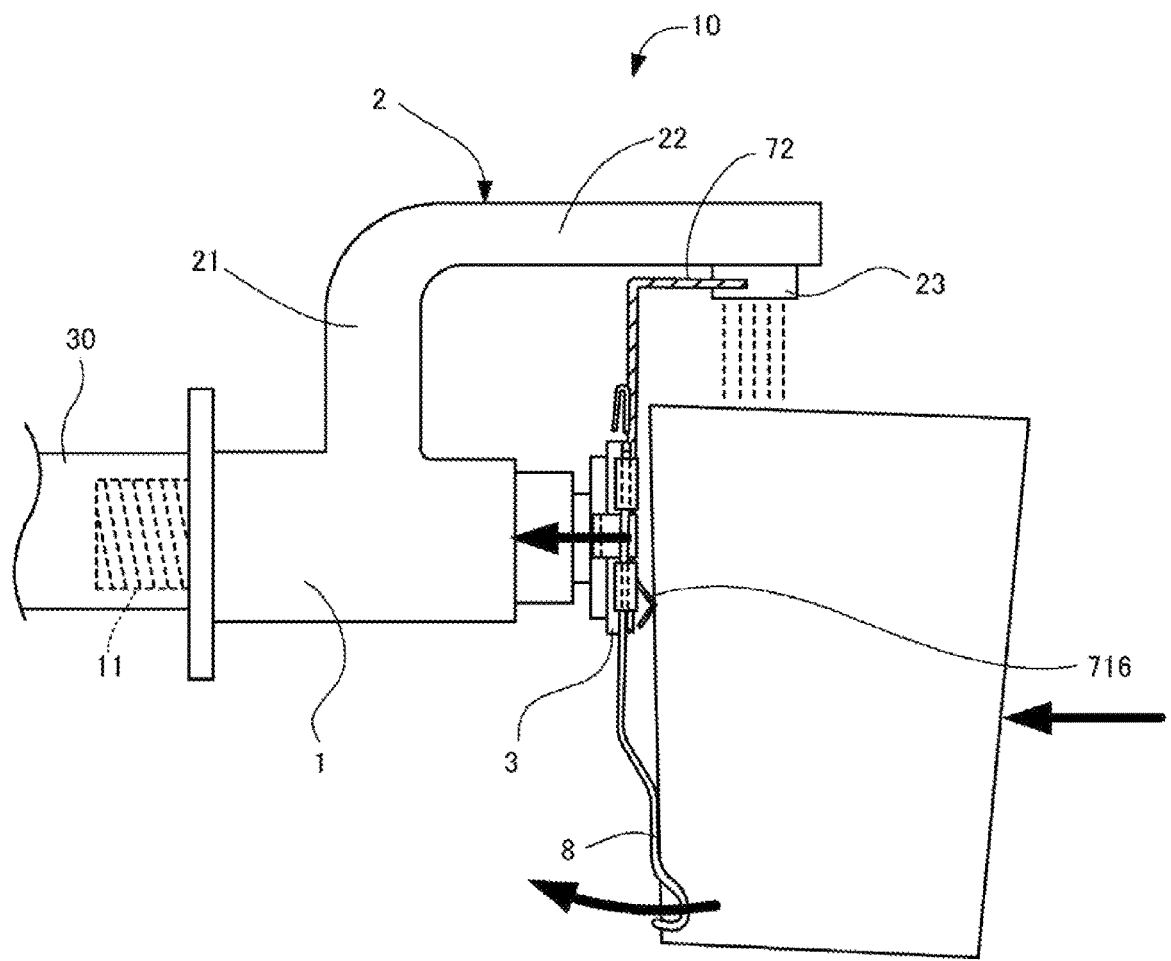

ATTACHMENT AND HOT-WATER SUPPLY DEVICE PROVIDED WITH THE SAME

TECHNICAL FIELD

The present invention relates to an attachment and a hot-water supply device provided with the same.

BACKGROUND ART

Hot-water faucets for serving tea are installed at tables in sushi train restaurants and the like. For example, the hot-water supply faucet disclosed in Patent Literature 1 includes a faucet body that is connected to a hot-water branch pipe branching from a circulation pipe through which hot water flows, an open/close mechanism that is attached to the front end of the faucet body, and a nozzle portion that is provided with a discharge outlet and extends upward from near the center of the faucet body in a front-rear direction.

The open/close mechanism includes a valve member that is housed inside the faucet body, and a press button for opening and closing the valve member. When the valve member is closed, hot water is restricted from being supplied from the faucet body toward the nozzle portion, and when the press button is pressed and the valve member is open, hot water flows from the faucet body toward the nozzle portion where it is discharged from the discharge outlet.

CITATION LIST

Patent Literature

Patent Literature 1: JP 2942715

SUMMARY OF INVENTION

Technical Problem

Incidentally, in such a hot-water supply faucet, the force required to open and close the valve member in order to discharge hot water is often set to a large force. Thus, there is the issue of a large force being required to press the press button, and it being hard to press the press button.

The present invention was realized to solve these issues, and it is an object thereof to provide an attachment and a hot-water supply device provided with the same that can reduce the force required to press the press button.
Solution to Problem The present invention is an attachment configured to be attached to a hot-water supply faucet including a nozzle portion that has a discharge outlet that is open downward, and a press button that is disposed below the discharge outlet and horizontally rearward of the discharge outlet, with hot water being discharged from the discharge outlet when the press button is pressed rearward, the attachment including: an attachment body; and a fixing means for fixing the attachment body to the hot-water supply faucet, wherein the attachment body includes: a fulcrum portion that is attachable to the nozzle portion; a body portion extending downward from the fulcrum portion; and a support portion that is attached to a lower end portion of the body portion, wherein the body portion is formed so as to extend downward past a front surface of the press button, and when the support portion is pressed by a vessel into which hot water is to be poured, the attachment body is configured to pivot and press the press button with the fulcrum portion serving as a fulcrum.

In the above attachment, a configuration is possible where the body portion is provided with a protruding portion configured to come into contact with the vessel, and a gap is formed between the vessel and the body portion.

In the above attachment, a configuration is possible where at least a portion of the support portion extends from the body portion so as to be positioned forward of the body portion.

In the above attachment, a configuration is possible where the support portion is provided with an abutment portion that extends along a circumferential direction of an outer circumferential surface of the vessel.

In the above attachment, a configuration is possible where the fixing means includes engagement portions that engage with at least one portion of a circumferential edge of the press button, and one of the engagement portions is configured to engage with an upper edge of the press button.

In the above attachment, a configuration is possible where the fixing [tool] means includes: a screw for passing through the body portion and fixing the body portion to the press button; and a washer through which the screw is inserted and that is disposed between the body portion and the press button and has a smaller diameter than the press button.

In the above attachment, a configuration is possible where a portion of the washer that comes into contact with the press button is formed by an annular protrusion portion.

A configuration is possible where, in an initial state where the attachment is attached to the hot-water supply faucet, the body portion is configured to extend obliquely relative to the washer and come into contact with a surrounding region of an upper end of the washer.

In the above attachment, a configuration is possible where the support portion is configured to be movable in an up-down direction relative to the body portion.

A hot-water supply device including: a hot-water supply faucet including a nozzle portion that has a discharge outlet that is open downward, and a press button that is disposed below the discharge outlet and horizontally rearward of the discharge outlet, with hot water being discharged from the discharge outlet when the press button is pressed rearward; and any one of the above attachments that is attached to the hot-water supply faucet.

Advantageous Effects of Invention

According to the present invention, it is possible to reduce the force required to press the press button.

BRIEF DESCRIPTION OF DRAWINGS

FIG. 1 is a side view of a hot-water supply faucet to which an attachment according to a first embodiment of the present invention is attached.

FIG. 2 is a side view showing the attachment according to the first embodiment attached to the hot-water supply faucet shown in FIG. 1.

FIG. 3 is a perspective view as seen from the front side of an attachment body.

FIG. 4 is a perspective view as seen from the rear side of the attachment body.

FIG. 5A is a perspective view of a washer.

FIG. 5B is a cross-sectional view of the washer.

FIG. 6 is a side view showing a method for using the attachment according to the first embodiment.

FIG. 7 is a side view showing the method for using the attachment according to the first embodiment.

FIG. 8A is a side view showing an operation mechanism of the washer.

FIG. 8B is a side view showing an operation mechanism of the washer.

FIG. 9 is a side view showing an attachment according to a second embodiment attached to the hot-water supply faucet shown in FIG. 1.

FIG. 10 is a perspective view as seen from the front side of the attachment according to the second embodiment.

FIG. 11 is a perspective view as seen from the rear side of the attachment according to the second embodiment.

FIG. 12 is a side view showing a relation between dimensions of a hot-water supply faucet and the attachment according to the second embodiment.

FIG. 13 is a side view showing a method for attaching the attachment according to the second embodiment.

FIG. 14 is a side view showing the method for attaching the attachment according to the second embodiment.

FIG. 15 is a side view showing a method for using the attachment according to the second embodiment.

FIG. 16 is a side view showing the method for using the attachment according to the second embodiment.

DESCRIPTION OF EMBODIMENTS

A. First Embodiment

Below, a first embodiment of an attachment attached to a hot-water supply faucet according to the present invention will be described with reference to the drawings. FIG. 1 is a side view of the hot-water supply faucet according to the present embodiment, and FIG. 2 is a side view showing the attachment attached to the hot-water supply faucet shown in FIG. 1. First, a hot-water supply faucet 10 will be described below, and then an attachment 20 attached thereto will be described. Note that, for convenience of description, the following description will be based on directions shown in FIG. 1. A direction perpendicular to the sheet of FIG. 1 will be described as the left-right direction. Other figures will be described based on these directions. However, these directions are only defined to describe the present embodiment, and the present invention is not limited to these directions.

1. Hot-Water Supply Faucet

The hot-water supply faucet 10 according to the present embodiment is used in stores such as sushi train restaurants, and is connected to a hot-water branch pipe 30 that is branched from a pipe (not shown) through which hot water used in the store flows. As shown in FIG. 1, the hot-water supply faucet 10 includes a pipe-shaped faucet body 1 that extends in the front-rear direction and is connected to the hot-water branch pipe 30, an open/close mechanism attached to the front end side of the faucet body 1, and a nozzle portion 2 that extends upward from near the center of the faucet body 1 in the front-rear direction.

The faucet body 1 has a cylindrical shape and the rear end portion thereof is provided with a male thread 11 for connection to the hot-water branch pipe 30. Hot water is supplied from the hot-water branch pipe 30 to the faucet body 1. The open/close mechanism includes a valve member (not shown) housed inside the faucet body 1, and a press button 3 for opening and closing the valve member. The valve member is disposed in a portion of the faucet body 1 to which the nozzle portion 2 is attached, and when the valve member is closed, hot water is restricted from being supplied from the faucet body 1 toward the nozzle portion 2, and when the valve member is open, hot water flows from the faucet body 1 toward the nozzle portion 2.

The press button 3 is attached to the front end portion of the faucet body 1. More specifically, the press button 3 is attached so as to be able to move by only a predetermined distance in the front-rear direction by a stopper (not shown). Also, the press button 3 is constantly biased forward by a spring (not shown). When the press button 3 is pressed rearward against the spring, the valve member opens, and hot water flows from the faucet body 1 toward the nozzle portion 2. Also, the front surface of the press button 3 is provided with a female thread 31 for attaching the attachment 20 to the press button 3, as described below. The portion constituting the foremost part of the press button 3 provided with the female thread 31 has a disc shape.

The nozzle portion 2 is a member for discharging hot water flowing from the faucet body 1, and includes a pipe-shaped first portion 21 that extends upward from the faucet body 1, and a pipe-shaped second portion 22 that extends forward from the upper end of the first portion 21, the nozzle portion 2 being substantially L-shaped as seen in a side view. However, the coupling portion between the first portion 21 and the second portion 22 has a smoothly curved shape as seen in a side view.

A cylindrical discharge outlet 23 protrudes slightly downward from the lower surface of the leading end portion of the second portion 22, and hot water is discharged from the discharge outlet 23. Also, by providing the first portion 21 and the second portion 22, the discharge outlet 23 is configured to be positioned above and forward of the press button 3.

When the press button 3 is pressed rearward, the valve member is opened, and hot water flows from the faucet body 1 to the nozzle portion 2, and hot water flows downward from out of the discharge outlet 23.

2. Attachment

Next, the attachment according to the present embodiment will be described with reference to FIGS. 3 to 5 as well. FIG. 3 is a perspective view as seen from the front side of the attachment, FIG. 4 is a perspective view as seen from the rear side of the attachment, FIG. 5A is a perspective view as seen from the front side of a washer provided on the attachment, and FIG. 5B is a cross-sectional view of the washer provided on the attachment.

As shown in FIG. 2, the attachment 20 is provided with an attachment body 4 made from a plate member, a flat head screw 6 for fixing the attachment body 4 to the hot-water supply faucet 10, and a washer 5 that is disposed between the attachment body 4 and the press button 3.

As shown in FIGS. 3 and 4, the attachment body 4 includes a body portion 41, a fulcrum portion 42 coupled to the upper end of the body portion 41, and a support portion 43 coupled to the lower end of the body portion 41, which are integrally formed as one piece.

The body portion 41 is made from a plate member that has a rectangular shape as seen from the front, and is provided with a rectangular first through hole 411 near the center in the up-down direction. A protruding portion 412 that extends downward is coupled to the upper edge of the first through hole 411. This protruding portion 412 includes a rectangular upper portion 413 coupled to the upper edge of the first through hole 411 and a lower portion 414 coupled to the lower end of the upper portion 413. The upper portion 413 extends obliquely downward and toward the front side from the upper edge of the first through hole 411, and the lower portion 414 extends obliquely downward and toward the rear side from the lower end of the upper portion 413. Therefore, the protruding portion 412 including the upper portion 413 and the lower portion 414 is formed so as to protrude forward in the shape of a peak as seen in a side view.

A circular second through hole 415 is formed above the protruding portion 412, and the aforementioned flat head screw 6 is inserted into the second through hole 415. Thus, the inner diameter of the second through hole 415 is smaller than the outer diameter of the head portion of the flat head screw 6.

The fulcrum portion 42 includes a rectangular first portion 421 that extends upward from the upper end portion of the main body portion 41, and a second portion 422 that extends forward from the upper end of the first portion 421. The first portion 421 is made from a plate member whose width is slightly smaller than the body portion 41, and extends slightly obliquely rearward from the body portion 41. The second portion 422 has a plate shape and the front end portion thereof is provided with an arcuate recessed portion 423. The recessed portion 423 engages with the outer circumferential surface of the discharge outlet 23 provided on the nozzle portion 2 from the rear side.

The support portion 43 includes a step portion 431 that extends forward from the lower end of the body portion 41, an extended portion 432 that extends downward from the front end of the step portion 431, a bottom wall portion 433 that extends forward from the lower end of the extended portion 432, and a pair of holding portions 434 that extend forward from two side edges of the extended portion 432, and these portions are integrally formed as one piece.

The extended portion 432 and the bottom wall portion 433 are coupled in an L shape as seen in a side view, and as described below, when hot water is to be supplied, a bottom portion 71 of a cup 7 is placed on the bottom wall portion 433, and the outer circumferential surface of the cup 7 is pressed against the extended portion 432. The pair of holding portions 434 are obliquely coupled to the extended portion 432 so as to separate from each other while extending forward from the extended portion 432. Thus, when the cup 7 is placed on the bottom wall portion 433, the outer circumferential surface of the cup 7 is held by the holding portions 434.

While the material forming the attachment body 4 is not particularly limited, the attachment body 4 can be made of metal, a resin material, or the like, for example.

Next, the washer 5 will be described. As described above, the washer 5 is disposed between the attachment body 4 and the press button 3, and as shown in FIGS. 5A and 5B, a flat surface 51 is provided on the attachment body 4 side of the washer 5, and the flat surface 51 comes into contact with the rear surface of the body portion 41 of the attachment body 4. On the other hand, the side of the washer 5 that comes into contact with the press button 3 has a peak shaped cross-section having an annular apex portion (protrusion portion) 52. That is, the peak-shaped cross-section extends obliquely rearward toward the apex portion 52 radially inward from the outer edge of the washer 5 and extends obliquely forward toward the inner edge of a through hole 53 radially inward from the apex portion 52. The apex portion 52 of the washer 5 comes into contact with the front surface of the press button 3.

3. Method for Attaching Attachment

Next, a method for attaching the attachment body 4 to the hot-water supply faucet 10 will be described. First, the attachment body 4 is positioned below the nozzle portion 2, and the recessed portion 423 of the fulcrum portion 42 is engaged with the outer circumferential surface of the discharge outlet 23 from the rear side. Next, with the washer 5 positioned between the attachment body 4 and the press button 3, the flat head screw 6 is inserted into the second through hole 415 from the front, and the male thread of the flat head screw 6 is screwed to the female thread 31 in the front surface of the press button 3. At this time, the flat head screw 6 is screwed in until a portion of the flat surface 51 of the washer 5 comes into contact with the rear surface of the attachment body 4 and the apex portion 52 comes into contact with the front surface of the press button 3. In doing so, as shown in FIG. 2, attachment of the attachment 20 is complete. At this time, as a result of adjusting the length of the second portion 422 of the fulcrum portion 42, the angle between the first portion 421 and the second portion 422, the angle between the fulcrum portion 42 and the body portion 41, and the like, the body portion 41 is disposed extending slightly obliquely downward relative to the front surface of the press button 3. Thus, in the initial state, the rear surface of the body portion 41 is disposed so as to be in contact with the upper end portion of the flat surface 51 of the washer 5 (see FIG. 8A)

4. Method for Using Hot-Water Supply Faucet

When the attachment 20 is attached to the hot-water supply faucet 10 as described above, hot water is supplied as follows. First, as shown in FIG. 6, the bottom portion 61 of the cup (vessel) 6 containing a tea bag or powdered tea is placed on the bottom wall portion 433 of the attachment body 4 while the lower end portion of the outer circumferential surface of the cup 6 is pressed against the extended portion 432. Note that it is sufficient to simply press the lower end portion of the outer circumferential surface of the cup 6 against the extended portion 432. At this time, the outer circumferential surface of the cup 6 comes into contact with the protruding portion 412, and thus does not come into contact with the body portion 41. Also, the outer circumferential surface of the cup 6 is supported from two sides by the pair of holding portions 434.

Thus, when the cup 6 is pressed against the extended portion 432, as shown in FIG. 7, the leading end of the fulcrum portion 42, that is, the recessed portion 423 that engages with the discharge outlet 23, acts as a fulcrum, and the attachment body 4 pivots rearward. In this process, the press button 3 is pressed by the attachment body 4, and hot water is discharged from the discharge outlet 23. Discharged hot water pools in the cup 6 positioned below the discharge outlet 23, and once the cup 6 contains the desired amount of hot water, pressing of the extended portion 432 by the cup 6 is released. Accordingly, the press button 3 is no longer pressed, and hot water stops being discharged from the discharge outlet 23 is stopped. Then, the cup 6 is removed from the attachment body 4.

5. Features

With the attachment 20 configured as described above, the following effects can be obtained.

(1) In the attachment body 4 according to the present embodiment, a configuration is employed where the fulcrum portion 42 acts as a fulcrum, and the cup 6 is pressed against the surrounding region of the lower end of the attachment body 4 below the press button 3, that is, against the extended portion 432. At this time, the press button 3 is pressed near the center of the attachment body 4 in the up-down direction, and thus the press button 3 can be pressed with a smaller force than when the press button 3 is pressed directly.

(2) The protruding portion 412 is provided on the body portion 41, and thus the outer circumferential surface near the upper opening of the cup 6, that is, the portion that comes into contact with the mouth of a user, can be prevented from coming into contact with the body portion 41, which is hygienic.

(3) When the extended portion 432 is pressed by the cup 6, the cup 6 is held from two sides by the pair of holding portions 434, and thus the cup 6 can be kept from shifting in the left-right direction. Thus, the force required to press the cup 6 can efficiently act rearward.

(4) The washer 5 that is smaller than the outer diameter of the press button 3 is disposed between the press button 3 and the attachment body 4, and thus the pressing force can be efficiently transferred to the press button 3 via the washer 5. This point will be described with reference to FIGS. 8.

As shown in FIG. 8A, in the initial state, the body portion 41 of the attachment body 4 is obliquely in contact with the flat surface 51 of the washer 5. Specifically, the body portion 41 is in contact with the surrounding region of the upper end of the flat surface 51, and a gap is formed between the lower end of the flat surface 51 and the body portion 41. When the attachment body 4 is pressed from this state, the body portion 41 comes into contact with the surrounding region of the lower end of the flat surface 51, and a gap is formed between the upper end of the flat surface 51 and the body portion 41. In this way, the body portion 41 and the washer 5 come into point or linear contact, and not surface contact, such that the contact portion changes in order to be able to support pivoting by the attachment body 4. Accordingly, even when the attachment body 4 pivots, a force can be efficiently transferred.

Furthermore, the portion of the washer 5 that comes into contact with the press button 3 is the annular apex portion 52, and generally comes in linear contact with the press button 3. Also, the apex 52 has a smaller diameter than the outer diameter of the washer 5. Thus, the force acting on the washer 5 can be concentrated on the surrounding region of the center of the press button 3, and the force for pressing the cup 6 can be efficiently transferred to the press button 3. Consequently, the force required to press the press button 3 can be reduced.

6. Variations

An embodiment of the present invention has thus been described, but the present invention is not limited to the above description, and various modifications can be made provided they do not depart from the gist of the present invention. Note that the following variations can be combined as necessary.

(1) The structure of the washer 5 is not particularly limited, and a normal washer not provided with the apex portion 52, that is, a washer whose two surfaces in an axial direction are flat surfaces, may be used. Also, the washer 5 is not necessarily required, and the body portion 41 can be directly fixed to the press button 3. Also, a fixing tool such as a bolt may be used in place of the flat head screw 6. Furthermore, the attachment position of the flat head screw 6 or the like is not particularly limited, and may be a position other than the press button 3.

(2) In the above embodiment, the attachment body 4 is disposed slightly obliquely relative to the press button 3, but the attachment body 4 may be installed such that the attachment body 4 and the front surface of the press button 3 are parallel to each other.

(3) In the above embodiment, the attachment body 4 is formed in one piece from a plate member, but can also be formed by combining a plurality of members.

(4) The support portion 43 is disposed so as to be positioned forward of the body portion 41, but the support portion 43 may be disposed as an extension of the body portion 41.

(5) The configuration of the protruding portion 412 is not particularly limited, and it is sufficient that a gap is formed between the attachment body 4 and the cup 6. However, the protruding portion 412 is not necessarily required, and may not be provided. Similarly, the holding portions 434 are not necessarily required either.

(6) While the recessed portion 423 is formed in the fulcrum portion 42 of the attachment body 4 and is attached to the outer circumferential surface of the discharge outlet 23, the present invention is not limited to this, and the attachment position and the attachment method are not particularly limited, provided that the recessed portion 423 is attached to the nozzle portion 2 at a position above the press button 3 where it can act as a fulcrum during rotation. Also, the attachment body 4 may be of a size where it can be attached to any position of the nozzle portion 2 such as the discharge outlet 23 such that the fulcrum portion 42 acts as a fulcrum when the attachment body 4 comes into direct or indirect contact with the press button 3.

(7) In the attachment 20 of the above embodiment, the attachment body 4 can be easily removed from the hot-water supply faucet 10 by removing the flat head screw 6, and thus the attachment body 4 can be removed for cleaning when the attachment body 4 is dirty, for example. Also, the attachment body 4 can be easily replaced when it is damaged. Furthermore, the hot-water supply faucet 10 can also be used in a state where the attachment 20 has been removed.

B. Second Embodiment

Next, a second embodiment of the attachment of the present invention will be described with reference to FIGS. 9 to 12. FIG. 9 is a side view showing an attachment attached to a hot-water supply faucet, FIG. 10 is a perspective view as seen from the front side of the attachment, FIG. 11 is a perspective view as seen from the rear side of the attachment, and FIG. 12 is a side view for showing a relation between dimensions of the attachment and the hot-water supply faucet. Note that the hot-water supply faucet is the same as that in the first embodiment and a description thereof is omitted.

1. Attachment

As shown in FIGS. 9 to 11, an attachment 70 includes an attachment body 7 made from a plate member, and a support portion 8 that extends from the lower end portion of the attachment body 7.

The attachment body 7 includes a body portion 71 and a fulcrum portion 72 coupled to the upper end of the body portion 71, and these portions are integrally formed as one piece. Also, the back surface of the body portion 71 is provided with a first engagement portion 73 that engages with an upper edge of the press button 3, and a protruding member 74 that is disposed below the first engagement portion 73 and is contactable with the press button 3.

The body portion 71 has a rectangular first portion 711 and a second portion 712 integrally coupled to the lower end portion of the first portion 711, the second portion 712 being wider than the first portion 711. The fulcrum portion 72 is coupled to the first portion 711 as described below. Upper and lower end portions on two sides of the second portion 712 are bent rearward into a U-shape, and each form an insertion portion 713 into which the later-described support portion 8 is inserted. Also, on two sides of the second portion 712, the portions between the insertion portions 713 lined up in the up-down direction are bent rearward into a U shape, and respectively form second engaging portions 714 that engage with the outer edge of the press button 3. The second engagement portions 714 protrude rearward past the insertion portions 713.

The lower end of the body portion 71 is provided with a rectangular notch 715, and a protruding portion 716 extending downward is coupled to the upper edge of the notch 715. The protruding portion 716 functions similarly to the protruding portion 412 in the first embodiment. Specifically, the protruding portion 716 includes a rectangular upper portion 717 that is coupled to the upper edge of the notch 715, and a lower portion 718 that is coupled to the lower end of the upper portion 717. The upper portion 717 extends obliquely downward and toward the front side from the upper edge of the notch 715, and the lower portion 718 extends obliquely downward and toward the rear side from the lower end of the upper portion 717. Thus, the protruding portion 716 including the upper portion 717 and the lower portion 718 is formed so as to protrude forward in a peak shape as seen in a side view.

As shown in FIG. 11, the first engagement portion 73 has a plate-shaped first portion 731 that is fixed to the back surface of the body portion 71 using an adhesive or the like, and a plate-shaped second portion 732 that extends downward from the upper end of the first portion 731. The second portion 732 extends obliquely downward and toward the rear side from the upper end of the first portion 731, and a gap is formed between the second portion 732 and the first portion 731. Also, the first portion 731 and the second portion 732 are coupled to each other in an elastically deformable manner, and when a force acting forward is applied to the second portion 732, the second portion 732 approaches the first portion 731.

The protruding member 74 is a columnar, rod-shaped member that extends horizontally, and is fixed between the first engagement portion 73 and the protruding portion 716 on the back surface of the body portion 71 using an adhesive or the like.

The fulcrum portion 72 is formed extending forward from the upper end portion of the body portion 71 so as to be orthogonal to the body portion 71. The fulcrum portion 72 has a plate shape and the front end portion thereof is provided with an arcuate recessed portion 721. The recessed portion 721 engages with the outer circumferential surface of the discharge outlet 23 provided on the nozzle portion 2 from the rear side.

Next, the support portion 8 will be described. The support portion 8 is a member formed by bending a wire member, and supports the surrounding region of the lower end of the cup 6, as described below. The support portion 8 is constituted by a pair of first portions 81, a pair of second portions 82, and a third portion 83. The first portions 81 are linear portions that form two ends of the support portion 8, and extend downward while inserted into the aforementioned insertion portions 713. The upper end of each first portion 81 is provided with a retaining portion 811 with a large outer size that prevents the support portion 8 from coming loose downward from the insertion portions 713. The lower ends of the first portions 81 are respectively provided with the second portions 82. The second portions 82 extend obliquely so as to approach each other while extending forward from the first portions 81, as well as linearly extending downward. The third portion 83 is provided so as to couple the lower end portions of the two second portions 82. The third portion 83 has an elliptical shape that is elongated in the horizontal direction, and is formed in an arcuate shape in a plan view such that two end portions thereof protrude forward. Because the third portion 83 is arcuate, the third portion 83 can be abutted against the outer circumferential surface of the cup 6.

By inserting the first portions 81 into the corresponding insertion portions 713 as described above, the support portion 8 can be moved up and down relative to the body portion 71. Thus, it is possible to adjust the position of the support portion 8 according to the length of the cup 6 in the up-down direction.

As shown in FIG. 12, in the present embodiment, the relationship between dimensions of the hot-water supply faucet 10 and the attachment 70 is set as described below.

As shown in FIG. 12, a distance D1 in the horizontal direction between the front surface of the press button 3 of the hot-water supply faucet 10 and the rear end portion of the discharge outlet 23 is smaller than a distance D2 in the horizontal direction between the rear end of the protruding member 74 and the rear end of the recessed portion 721 of the fulcrum portion 72 when the body portion 71 of the attachment 70 is disposed so as to extend vertically. Thus, as described below, the attachment 70 can be attached to the hot-water supply faucet 10 using the biasing force of the press button 3 or the first engagement portion 73.

2. Method for Attaching Attachment

Next, the method for attaching the attachment 70 to the hot-water supply faucet 10 will be described with reference to FIGS. 13 and 14. First, the protruding member 74 and the first engagement portion 73 of the attachment 70 are pressed against the front surface of the press button 3, and while the press button 3 is being pressed, the second engagement portions 714 are engaged with the outer edge of the press button 3 from below. At this time, the first engagement portion 73 is being pressed, and thus the second portion 732 approaches the first portion 731 through elastic deformation. In this state, as shown in FIG. 13, the recessed portion 721 of the fulcrum portion 72 is engaged with the rear end of the discharge outlet 23 of the hot-water supply faucet 10 while the attachment 70 is being slid upward. In this process, when the first engagement portion 73 is moved to a position above the press button 3, pressing of the second portion 732 is released, and thus the second portion 732 reverts to its original state, as shown in FIG. 14. Accordingly, the second portion 732 is engaged with the upper edge of the press button 3. At this time, the protruding member 74 is disposed at a position where it is contactable with the front surface of the press button 3.

When pressing of the press button 3 is released, the distance D1 is smaller than the distance D2, and the first engagement portion 73 engages with the upper edge of the press button 3, as shown in FIG. 12, and thus the attachment 70 is retained and prevented from coming loose downward. Also, the second engagement portions 714 are engaged with two sides of the outer edge of the press button 3, and thus horizontal shifting of the attachment 70 relative to the press button 3 can be prevented. Thus, attachment of the attachment 70 is complete.

3. Method for Using Hot-Water Supply Faucet

When the attachment 70 is attached to the hot-water supply faucet 10 as described above, hot water is supplied as follows. First, as shown in FIG. 15, the cup 6 containing a tea bag or powdered tea is brought into contact with the surrounding region of the protruding portion 716 of the attachment 70 and the third portion 83 of the support portion 8 while pressing the lower end portion of the cup 6 against the third portion 83.

Thus, as shown in FIG. 16, the leading end of the fulcrum portion 72, that is, the recessed portion 721 that engages with the discharge outlet 23, acts as a fulcrum, and the attachment 70 pivots rearward. In this process, the press button 3 is pressed by the attachment 70, and hot water is discharged from the discharge outlet 23. Discharged hot water pools in the cup 6 positioned below the discharge outlet 23, and once the cup 6 contains the desired amount of hot water, pressing of the support portion 8 by the cup 6 is released. Accordingly, the press button 3 is no longer pressed, and hot water stops being discharged from the discharge outlet 23 is stopped. Then, the cup 6 is removed from the attachment 70.

4. Features

With the attachment 70 configured as described above, the following effects can be obtained in addition to the effects that can be obtained with the attachment of the first embodiment.

(1) The attachment 70 can be attached to the hot-water supply faucet 10 while being slid, and thus there is no need to use a tool, which facilitates attachment.

(2) The protruding member 74 can provide a similar effect to that of the washer of the attachment in the first embodiment. In other words, the protruding member 74 has a rod shape, and thus the force for pressing the attachment 70 via the cup 6 can concentratedly act on the press button 3. Also, the protruding member 74 has a columnar shape that extends horizontally, and thus the curved outer circumferential surface thereof comes into contact with the press button 3. Therefore, even if the attachment 70 comes into contact with the press button 3 at an oblique angle, the outer circumferential surface of the protruding member 74 is constantly in linear contact with the press button 3, and thus a force can be efficiently transferred to the press button 3.

(3) The position of the support portion 8 can be adjusted relative to the body portion 71, and thus the position of the support portion 8 can be changed according to the height of the cup 6.

5. Variations

Embodiments of the present invention have thus been described, but the present invention is not limited to the above embodiments, and various modifications can be made provided they do not depart from the gist of the present invention. Note that the following variations can be combined as appropriate.

(1) In the second embodiment, the support portion 8 can be moved relative to the attachment body 7, but the support portion 8 may be fixed to the attachment body 7. The support portion 8 is not limited in terms of shape, and may be made from a plate member instead of a wire member.

(2) The configurations of the first engagement portion 73 and the second engagement portions 714 are not particularly limited, and there is no particular limit provided that the first engagement portion 73 and the second engagement portions 714 engage with the press button 3. Thus, the first engagement portion 73 and the second engagement portions 714 can be modified as needed to match the shape of the press button.

(3) The protruding member 74 may have a shape different from the above-described rod shape, and it is sufficient that a member that comes into contact with the press button 3 with a small surface area is a member such as a member that makes point or linear contact with the press button 3. However, the protruding member 74 is not essential, and may be provided as needed. If the protruding member 74 is not provided, in the dimension relation shown in FIG. 12, the distance D2 is a distance between a portion of the attachment 70 that comes into contact with the press button 3 to a rear end portion of the recessed portion 721 of the fulcrum portion 72. The protruding portion 716 is also not essential, and may be provided as needed.

(4) In the above embodiments, an example was described where the attachment 70 according to the present invention is applied to a hot-water supply faucet in a sushi train restaurant, but the present invention is not limited to this, and the attachment 20 can be applied to various hot-water supply faucets. However, it is sufficient that a hot-water supply faucet to which the attachment according to the present invention is applied may at least include the nozzle portion 2 including the discharge outlet that is open downward, and the press button 3 that is disposed below and horizontally rearward of the discharge outlet 23, while the other configurations are not particularly limited.

10 Hot-water supply faucet
23 Discharge outlet
3 Press button
20 Attachment
4 Attachment body
41 Body portion
412 Protruding portion
42 Fulcrum portion
43 Support portion
431 Step portion
5 Washer (fixing means
52 Apex portion (Protrusion portion)
6 Flat head screw (fixing means
7 Attachment
71 Body portion
72 Support portion
715 Protruding portion
8 Support portion

The invention claimed is:

1. An attachment configured to be attached to a hot-water supply faucet including a nozzle portion that has a discharge outlet that is open downward, and a press button that is disposed below the discharge outlet and horizontally rearward of the discharge outlet, with hot water being discharged from the discharge outlet when the press button is pressed rearward, the attachment comprising:
an attachment body; and
a fixing means for fixing the attachment body to the hot-water supply faucet,
wherein the attachment body includes:
a fulcrum portion that is attachable to the nozzle portion;
a body portion extending downward from the fulcrum portion; and
a support portion that is attached to a lower end portion of the body portion;
wherein the body portion is formed so as to extend downward past a front surface of the press button, and when the support portion is pressed by a vessel into which hot water is to be poured, the attachment body is configured to pivot and press the press button with the fulcrum portion serving as a fulcrum.

2. The attachment according to claim 1,
wherein the body portion is provided with a protruding portion configured to come into contact with the vessel, and
a gap is formed between the vessel and the body portion.

3. The attachment according to claim 1,
wherein at least a portion of the support portion extends from the body portion so as to be positioned forward of the body portion.

4. The attachment according to claim 1,
wherein the support portion is provided with an abutment portion that extends along a circumferential direction of an outer circumferential surface of the vessel.

5. The attachment according to claim 1,
wherein the fixing means includes engagement portions that engage with at least one portion of a circumferential edge of the press button, and
one of the engagement portions is configured to engage with an upper edge of the press button.

6. The attachment according to claim 1,
wherein the support portion is configured to be movable in an up-down direction relative to the body portion.

7. A hot-water supply device comprising:
a hot-water supply faucet including a nozzle portion that has a discharge outlet that is open downward, and a press button that is disposed below the discharge outlet and horizontally rearward of the discharge outlet, with hot water being discharged from the discharge outlet when the press button is pressed rearward; and
the attachment according to claim 1 that is attached to the hot-water supply faucet.

8. The attachment according to claim 1,
wherein the fixing means includes:
a screw for passing through the body portion and fixing the body portion to the press button; and
a washer through which the screw is inserted and that is disposed between the body portion and the press button and has a smaller diameter than the press button.

9. The attachment according to claim 8,
wherein a portion of the washer that comes into contact with the press button is formed by an annular protrusion portion.

10. The attachment according to claim 8,
wherein, in an initial state where the attachment is attached to the hot-water supply faucet, the body portion is configured to extend obliquely relative to the washer and come into contact with a surrounding region of an upper end of the washer.

* * * * *